United States Patent
Filho et al.

(10) Patent No.: US 7,069,958 B2
(45) Date of Patent: Jul. 4, 2006

(54) ASSEMBLY AND METHOD FOR STIFFENING A FLEXIBLE PIPE

(75) Inventors: Helio Marins David Filho, Rio de Janeiro (BR); Marcio Henriques Albuquerque, Rio de Janeiro (BR)

(73) Assignee: Wellstream International Limited, Newcastle upon Tyne (GB)

( * ) Notice: Subject to any disclaimer, the term of this patent is extended or adjusted under 35 U.S.C. 154(b) by 34 days.

(21) Appl. No.: 10/767,539

(22) Filed: Jan. 29, 2004

(65) Prior Publication Data

US 2005/0166988 A1    Aug. 4, 2005

(51) Int. Cl.
*F16L 9/14*    (2006.01)

(52) U.S. Cl. .............. 138/153; 138/172; 138/106; 138/112; 248/49; 248/56

(58) Field of Classification Search ......... 138/112, 138/153, 106, 172; 405/184.4; 248/62, 248/55, 49, 56
See application file for complete search history.

(56) References Cited

U.S. PATENT DOCUMENTS

| | | | | |
|---|---|---|---|---|
| 3,508,587 A | | 4/1970 | Mauch | 138/119 |
| 3,649,054 A | * | 3/1972 | McClenan | 285/149.1 |
| 3,721,269 A | | 3/1973 | Choate et al. | 138/119 |
| 3,744,008 A | * | 7/1973 | Castellani | 248/56 |
| 4,304,148 A | * | 12/1981 | Hamman | 74/502.4 |
| RE32,508 E | | 9/1987 | Feucht | 138/119 |
| 4,850,395 A | | 7/1989 | Briggs | 138/30 |
| 5,080,529 A | | 1/1992 | Watanabe et al. | 138/119 X |
| 5,220,132 A | * | 6/1993 | Macey | 174/65 SS |
| 5,360,009 A | | 11/1994 | Herskovitz | 600/538 |
| 5,410,104 A | * | 4/1995 | Gretz et al. | 174/65 SS |
| 5,526,846 A | | 6/1996 | Maloberti et al. | 138/109 |
| 6,073,890 A | * | 6/2000 | Daoud | 248/56 |
| 6,220,303 B1 | | 4/2001 | Secher et al. | 138/110 |
| 6,305,425 B1 | * | 10/2001 | Korn | 138/110 |
| 6,409,179 B1 | * | 6/2002 | Daoud | 277/602 |
| 6,746,055 B1 | * | 6/2004 | Wood et al. | 285/249 |
| 2003/0127147 A1 | | 7/2003 | Van Dam et al. | 138/127 |

FOREIGN PATENT DOCUMENTS

EP    0911482    4/1999

OTHER PUBLICATIONS

"Bend Stiffener Connector System," MIB International Ltd. website http://www.mibitaliana.it/bend.html, 2 pages (publication date unknown).
"OrcaBend—Bend Stiffener Optimisation Software," Orcina Limited, 4 pages (publication date unknown).
PCT International Search Report for PCT Appl. No. PCT/GB2005/000264.

* cited by examiner

*Primary Examiner*—Patrick Brinson
(74) *Attorney, Agent, or Firm*—Klarquist Sparkman, LLP

(57) ABSTRACT

An assembly and method for stiffening a flexible member according to which a stiffening member and an adapter surround the flexible member and an insert extends in an annulus between the adapter and the flexible member.

16 Claims, 1 Drawing Sheet

ASSEMBLY AND METHOD FOR STIFFENING A FLEXIBLE PIPE

BACKGROUND

This invention relates to an assembly and method for stiffening a flexible pipe.

Flexible pipes, or other flexible components such as tubes, risers, umbilicals, cables, and the like (hereinafter collectively referred to as "flexible members") are often subjected to substantial bending moments. For example, when flexible members are used in subsea operations to transfer fluids, the hydrodynamic effects of water current can cause substantial bending moments on the flexible members, especially at their termination points. This can lead to fatigue failure in the flexible member.

To guard against any damage that would be caused by these bending moments, bend stiffeners are often placed around the flexible members to increase their stiffness and thus decrease the bending moments. A typical bend stiffener is formed by an elastomer tapered sleeve that extends around the flexible pipe and is secured to the pipe by an adapter. However, the internal diameter of the adapter usually engages the outer surface of the flexible member, which can cause excessive wear on the flexible member that could compromise its integrity.

Therefore, what is needed is an adapter for a flexible member that eliminates this problem.

DETAILED DESCRIPTION

Figure 1:
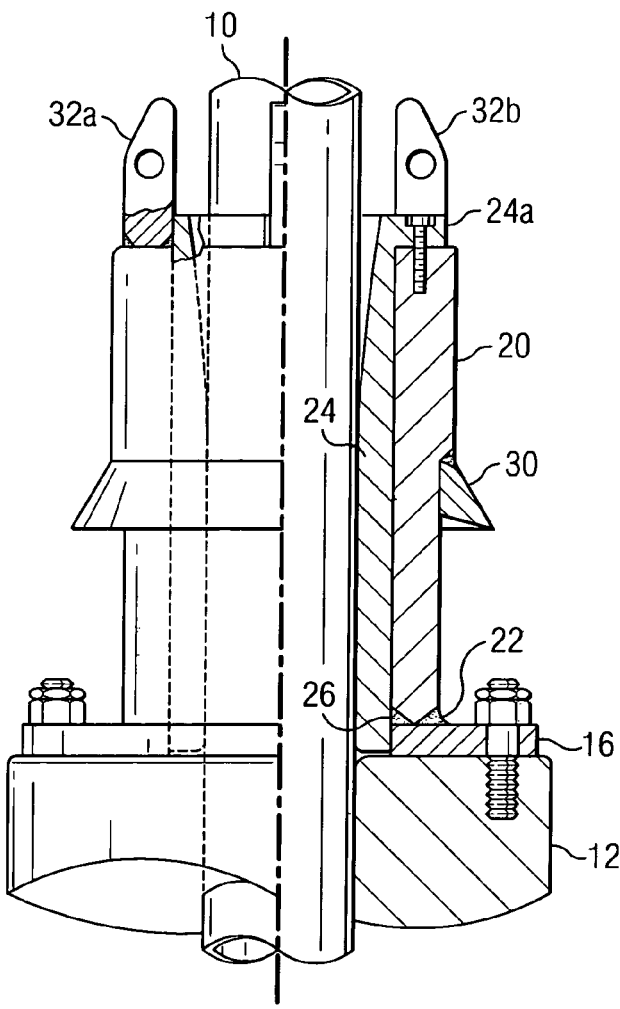
FIG. 1 is a partial elevational/partial cross-sectional view of an assembly according to an embodiment of the invention.
Figure 2:
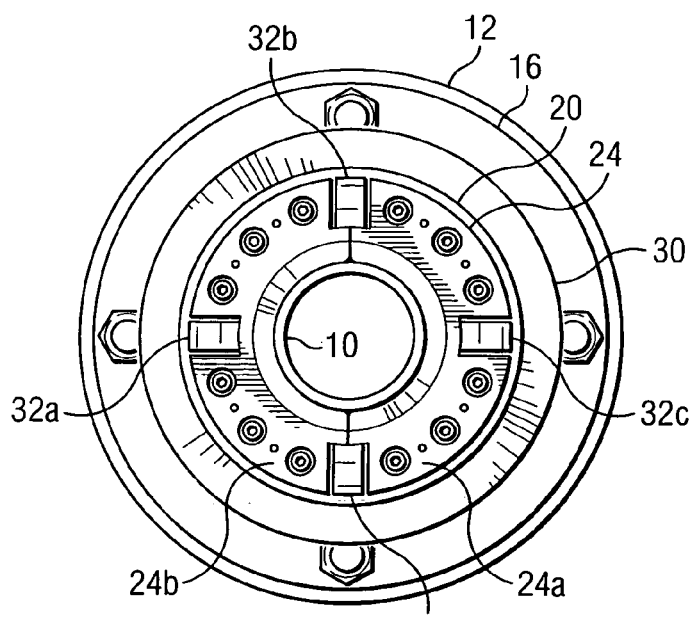
FIG. 2 is a top plan view of the assembly of FIG. 1.

Referring to FIGS. 1 and 2, a flexible member, in the form of a pipe 10, is shown, and it is understood that it is disposed in an environment in which it is subjected to the bending moments discussed above. A cylindrical bend stiffener 12 surrounds a portion of the pipe 10 that needs to be stiffened, such as a joint between two adjacent sections of the pipe, an area near a termination point of the pipe, or the like. The inner surface of the bend stiffener 12 is in contact with the corresponding outer surface of the pipe 10, and it is understood that the outer surface of the remaining portion (not shown) of the bend stiffener 12 can be tapered slightly in a direction towards the pipe. Preferably, the bend stiffener 12 is fabricated from an elastomer material, such as polyurethane or polychloroprene.

A mounting ring 16 extends around the pipe 10 and is bolted to the upper end of the bend stiffener, as viewed in FIG. 1.

The lower end of a cylindrical adapter 20 is welded to the upper surface of the ring 16 by an annular weldment 22. The inner diameter of the adapter 20 extends in a spaced relation to the corresponding outer surface of the pipe 10 to form an annulus which receives a cylindrical insert 24. The inner surface of the insert 24 is in contact with the corresponding outer surface of the pipe 10, and the outer surface of the insert is in contact with the corresponding inner surface of the adapter 20. The inner surface of the lower end portion of the insert 24 is welded to the lower end of the adapter 20 and to the upper surface of the ring 16 by an annular weldment 26.

The insert 24 is split, e.g., it is formed by two sections 24a and 24b (FIG. 2), each having a semi-circular cross section, to facilitate the assembly of the insert in the above annulus between the pipe 10 and the adapter 20. Preferably the insert 24 is fabricated from polyurethane.

The outer surface of the insert 24 is stepped (FIG. 1), and an annular tapered flange 30 is welded to the shoulder formed at the step. In the event an outer tube structure (not shown) is placed around the pipe 10, or a portion of the pipe, above the bend stiffener 12, the flange 30 permits an enlarged mouth of the tube structure to be secured to the adapter 20 and the bend stiffener 12 by a tube bellmouth system (not shown).

An annular flange 24a extends radially outwardly from the upper end of the insert 24, and four padkeys 32a–32d (FIG. 2), spaced at ninety degree intervals, are bolted to the flange to receive a tow line, or the like (not shown).

The assembly formed by the bend stiffener 12, the adapter 20, and the insert 24 stiffens the portion of the pipe 10 extending within the assembly while the insert eliminates any engagement, and resultant wear, between the adapter and the pipe.

It is understood that variations may be made in the above, without departing from the scope of the invention. For example, spatial references, such as "upper", "lower", "vertical", "angular", "radial" etc. are for the purpose of illustration only and do not limit the specific orientation or location of the structure described above. Also, the weldments 22 and 26 can be replaced by any other type of connectors such as bolts, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An assembly for stiffening a flexible member, the assembly comprising:
    a stiffening member extending over a portion of the flexible member;
    an adapter secured to the stiffening member and extending over another portion of the flexible member in a spaced relation thereto to form an annulus;
    an insert disposed in the annulus; and
    a ring connected to an end of the stiffening member, and wherein an end of the adapter is secured to the stiffening member by a weldment extending between the adapter and the ring.

2. The assembly of claim 1 wherein the insert is secured to the adapter and to the ring.

3. The assembly of claim 2 wherein the insert is secured to the adapter and to the ring by a weldment extending between the insert and the adapter, and by a weldment extending between the insert and the ring.

4. The assembly of claim 1 wherein the insert is secured to the adapter.

5. An assembly for stiffening a flexible member, the assembly comprising:

a stiffening member extending over a portion of the flexable member;

an adapter secured to the stiffening member and extending over another portion of the flexible member in a spaced relation thereto to form an annulus; and an insert disposed in the annulus, wherein the insert is secured to the adapter;

wherein the insert is secured to the adapter by a weldment extending between the insert and the adapter.

6. The assembly of claim 1 wherein the flexible member is a pipe and wherein the stiffening member, the adapter, and the insert are cylindrical.

7. An assembly for stiffening a flexible member, the assembly comprising:

a stiffening member extending over a portion of the flexible member;

an adapter secured to the stiffening member and extending over another portion of the flexible member in a spaced relation thereto to form an annulus; and an insert disposed in the annulus to prevent the adapter from contacting said another portion of the flexible member, wherein the insert is fabricated from a material to eliminate wear of said another portion of the flexible member;

wherein the flexible member is a pipe and wherein the stiffening member, the adapter, and the insert are cylindrical;

wherein the insert is formed by two semi-circular insert portions.

8. A method for stiffening a flexible member, the method comprising:

surrounding a portion of the flexible member with a stiffening member;

surrounding another portion of the flexible member with an adapter that extends in a spaced relation to the flexible member to form an annulus;

securing the adapter to the stiffening member;

inserting an insert into the annulus; and connecting a ring to an end of the stiffening member, and wherein the step of securing comprises welding the adapter to the ring.

9. The method of claim 8 further comprising securing the insert to the adapter and to the ring.

10. The method of claim 9 wherein the latter step of securing comprises welding the insert to the adapter and to the ring.

11. The method of claim 8 further comprising securing the insert to the adapter.

12. A method for stiffening a flexible member, the method comprising:

surrounding a portion of the flexible member with a stiffening member;

surrounding another portion of the flexible member with an adapter that extends in a spaced relation to the flexible member to form an annulus;

securing the adapter to the stiffening member;

inserting an insert into the annulus; and welding the insert to the adapter.

13. The method of claim 8 wherein the insert is made of an elastomer material.

14. The method of claim 8 wherein the insert is made of polyurethane.

15. The assembly of claim 5 wherein said insert is fabricated from an elastomer material.

16. The assembly of claim 5 wherein said insert is fabricated from polyurethane.

* * * * *